United States Patent
Peng et al.

(10) Patent No.: US 12,332,821 B2
(45) Date of Patent: Jun. 17, 2025

(54) CIRCUIT, METHOD AND DEVICE FOR ADDRESSING CAN NODES

(71) Applicant: Sungrow Energy Storage Technology Co., Ltd., Hefei (CN)

(72) Inventors: Changying Peng, Hefei (CN); Jie Yang, Hefei (CN); Lin Wang, Hefei (CN); Fei Chen, Hefei (CN)

(73) Assignee: Sungrow Energy Storage Technology Co., Ltd., Anhui (CN)

( * ) Notice: Subject to any disclaimer, the term of this patent is extended or adjusted under 35 U.S.C. 154(b) by 32 days.

(21) Appl. No.: 18/520,149

(22) Filed: Nov. 27, 2023

(65) Prior Publication Data
US 2024/0419620 A1    Dec. 19, 2024

(30) Foreign Application Priority Data
Jun. 16, 2023   (CN) .......................... 202310730757.5

(51) Int. Cl.
*G06F 3/00*   (2006.01)
*G06F 13/40*  (2006.01)

(52) U.S. Cl.
CPC .................................. *G06F 13/404* (2013.01)

(58) Field of Classification Search
None
See application file for complete search history.

(56) References Cited

U.S. PATENT DOCUMENTS 10,795,845 B1 * 10/2020 Vemuri ............. H04L 12/40019
2013/0094353 A1    4/2013 Monroe et al.
2019/0074556 A1 *  3/2019 Onoda ................. H01M 10/425
2019/0116480 A1    4/2019 Schultz et al.
2020/0142462 A1    5/2020 Durham et al.
2021/0294771 A1 *  9/2021 Kempf .................. G06F 13/409
2023/0318871 A1   10/2023 Li et al.

FOREIGN PATENT DOCUMENTS

| CN | 112887443 A | 6/2021 |
| JP | 2017-092639 A | 5/2017 |
| WO | WO 2021/041292 A1 | 3/2021 |

OTHER PUBLICATIONS

Extended European Search Report for European Application No. 23210768.0, dated May 21, 2024.
First Examination Report for Australian Patent Application No. 2023270235, dated Aug. 28, 2024.

* cited by examiner

*Primary Examiner* — Henry Tsai
*Assistant Examiner* — Dean Phan
(74) *Attorney, Agent, or Firm* — Wolf, Greenfield & Sacks, P.C.

(57) ABSTRACT

A circuit, method and device for addressing CAN nodes are provided. The circuit includes: a fuse adapter board including a short-circuited circuit; a first CMU including a first MCU and a first CAN identification circuit; and a second CMU including a second MCU and a second CAN identification circuit. The fuse adapter board is connected to the first MCU or the second MCU through the short-circuited circuit, and is configured to control the short-circuited circuit to be shorted to enable a level on a GPIO pin of the first MCU or the second MCU connected to the short-circuited circuit to be a low level, so that the first MCU and the second MCU set their respective CAN addressing based on the respective levels of the respective GPIO pins.

15 Claims, 4 Drawing Sheets

CIRCUIT, METHOD AND DEVICE FOR ADDRESSING CAN NODES

This application claims priority to Chinese Patent Application No. 202310730757.5, titled "CIRCUIT, METHOD AND DEVICE FOR ADDRESSING CAN NODES", filed on Jun. 16, 2023, with the China National Intellectual Property Administration, which is incorporated herein by reference in its entirety.

FIELD

The present disclosure relates to the technical field of CAN addressing, and in particular to a circuit, method and device for addressing CAN nodes.

BACKGROUND

In a conventional energy storage system, two microcontroller units (MCU) are disposed in a cell monitor unit (CMU), in order to be compatible with designs and realize a common platform for circuits. With the two MCUs, the system is compatible with a 0.5C project and a 0.25C project. The 0.25C, 0.5C refer to projects named by a battery charge and discharge rate or capacity.

Conventionally, CAN peripherals of the MCUs on the CMU are integrated within the CMU. For the 0.25C project, a pull-down resistor may be added behind each MCU to address the CAN peripherals of the MCUs separately, as shown in FIG. 1. In this case, after MCU1 and MCU2 are powered on, a GPIO pin of MCU1 has a high level, and a GPIO pin of MCU2 has a low level. Therefore, for the 0.25C project, the MCU1 and MCU2 can perform independent addressing by identifying levels of GPIO pins, respectively.

In contrast, for the 0.5C project, it is required to use two CMU boards. In order to maintain consistency of BOM of the two CMUs, only the MCU1 parts are connected in the two CMUs. As shown in FIG. 2, when the two MCU1s are powered on simultaneously, GPIO pins of the two MCU1s both have a high level. In this case, the two MCU1s are unable to address independently by using levels of the GPIO pins of the MCUs.

SUMMARY

In view of this, a circuit, method and device for addressing CAN nodes are provided according to the present disclosure.

To this end, technical solutions of the present disclosure are provided as follows.

In a first aspect of the present disclosure, a circuit for addressing CAN nodes is provided. The circuit includes a fuse adapter board, a first CMU and a second CMU; the fuse adapter board includes a short-circuited circuit; the first CMU includes a first MCU and a first CAN identification circuit; where, a first terminal of the first MCU is connected to a CAN interface in the fuse adapter board through a CAN interface; and a second terminal of the first MCU is connected to the first CAN identification circuit; the second CMU includes a second MCU and a second CAN identification circuit; where, a first terminal of the second MCU is connected to the CAN interface in the fuse adapter board through a CAN interface; a second terminal of the second MCU is connected to the second CAN identification circuit; the fuse adapter board is connected to the first MCU or the second MCU through the short-circuited circuit, and is configured to control the short-circuited circuit to be shorted to enable a level on a GPIO pin of the first MCU or a GPIO pin of the second MCU connected to the short-circuited circuit to be a low level; the first MCU is configured to set a CAN addressing based on a level on the GPIO pin of the first MCU; and the second MCU is configured to set a CAN addressing based on a level on the GPIO pin of the second MCU.

In an embodiment, in a case that the fuse adapter board is connected to the first MCU through the short-circuited circuit, and the first CAN identification circuit includes a first resistor; wherein, the second terminal of the first MCU is connected to a first terminal of the first resistor, the first terminal of the first resistor is grounded through the short-circuited circuit, and a second terminal of the first resistor is connected to a power supply.

In an embodiment, the second CAN identification circuit includes a second resistor; and the second terminal of the second MCU is connected to a first terminal of the second resistor, and a second terminal of the second resistor is connected to the power supply.

In an embodiment, in a case that the fuse adapter board is connected to the second MCU through the short-circuited circuit, and the second CAN identification circuit includes a second resistor; wherein the second terminal of the second MCU is connected to a first terminal of the second resistor, the first terminal of the second resistor is grounded through the short-circuited circuit, and a second terminal of the second resistor is connected to a power supply.

In an embodiment, the first CAN identification circuit includes a first resistor; and the second terminal of the first MCU is connected to a first terminal of the first resistor, and a second terminal of the first resistor is connected to the power supply.

In an embodiment, the short-circuited circuit includes a switch; a first terminal of the fuse adapter board is connected to a first terminal of the switch, and a second terminal of the fuse adapter board is connected to a second terminal of the switch; the first terminal of the switch is connected to the second terminal of the first MCU or the second terminal of the second MCU, and the second terminal of the switch is grounded; and the switch is switched on after the first MCU and the second MCU are powered on, to enable the level on the GPIO pin of the first MCU or the GPIO pin of the second MCU connected to the first terminal of the switch to be the low level.

In an embodiment, a first terminal of the fuse adapter board is connected to a second terminal of the fuse adapter board; the first terminal of the fuse adapter board is connected to the second terminal of the first MCU or the second terminal of the second MCU, and the second terminal of the fuse adapter board is grounded; where the first terminal of the fuse adapter board serves as a first terminal of the short-circuited circuit, and the second terminal of the fuse adapter board serves as a second terminal of the short-circuited circuit; and the first terminal of the fuse adapter board and the second terminal of the fuse adapter board are shorted after the first MCU and the second MCU are powered on, to enable the level on the GPIO pin of the first MCU or the GPIO pin of the second MCU connected to the first terminal of the fuse adapter board to be the low level.

In a second aspect of the present disclosure, a method for addressing CAN nodes is provided. The method is applied to the circuit for addressing CAN nodes according to the first aspect of the present disclosure. The circuit includes a fuse adapter board, a first CMU and a second CMU, the fuse adapter board includes a short-circuited circuit, the first CMU includes a first MCU, and the second CMU includes a second MCU, and the method includes: generating a command for CAN peripheral addressing n, on detecting that the first MCU is powered on, the second MCU is powered on, and the short-circuited circuit is shorted; where a level on a GPIO pin of the first MCU or a level on a GPIO pin of the second MCU connected to the short-circuited circuit is a low level when the short-circuited circuit is shorted; and sending the command for CAN peripheral addressing n to the first MCU and the second MCU, to enable the first MCU and the second MCU to detect respective levels on respective GPIO pins thereof based on the command for CAN peripheral addressing n; where, each of the first MCU and the second MCU sets a respective CAN addressing to the CAN peripheral addressing n on detecting a high level on the respective GPIO pin; and each of the first MCU and the second MCU sets the respective CAN addressing to CAN peripheral addressing n+1 on detecting a low level on the respective GPIO pin.

In a third aspect of the present disclosure, a device for addressing CAN nodes is provided. The device is applied to the circuit for addressing CAN nodes according to the first aspect of the present disclosure. The circuit includes a fuse adapter board, a first CMU and a second CMU, the fuse adapter board includes a short-circuited circuit, the first CMU includes a first MCU, and the second CMU includes a second MCU, and the device includes: a CAN peripheral addressing n command generating circuit, configured to generate a command for CAN peripheral addressing n, on detecting that the first MCU is powered on, the second MCU is powered on, and the short-circuited circuit is shorted, where a level on a GPIO pin of the first MCU or the second MCU connected to the short-circuited circuit is a low level when the short-circuited circuit is shorted; and a CAN peripheral addressing n command sending circuit, configured to send the command for CAN peripheral addressing n to the first MCU and the second MCU, to enable the first MCU and the second MCU to detect respective levels of respective GPIO pins thereof based on the command for CAN peripheral addressing n; wherein each of the first MCU and the second MCU sets a respective CAN addressing to the CAN peripheral addressing n on detecting a high level on the respective GPIO pin; and each of the first MCU and the second MCU sets the respective CAN addressing to CAN peripheral addressing n+1 on detecting a low level on the respective GPIO pin.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION

Hereinafter technical solutions of embodiments of the present disclosure are described clearly and completely in conjunction with the drawings of the embodiments of the present disclosure. Apparently, the embodiments described below are only some embodiments, rather than all the embodiments of the present disclosure. Any other embodiments obtained by those skilled in the art based on the embodiments in the present disclosure without any creative effort shall fall within the protection scope of the present disclosure.

In the present disclosure, terms of "include", "comprise" or any other variants are intended to be non-exclusive. Therefore, a process, method, article or device including a series of elements includes not only the elements but also other elements that are not enumerated, or further includes the elements inherent for the process, method, article or device. Unless expressively limited otherwise, the statement "comprising (including) one . . . " does not exclude existence of other similar elements in the process, method, article or device.

Figure 1:
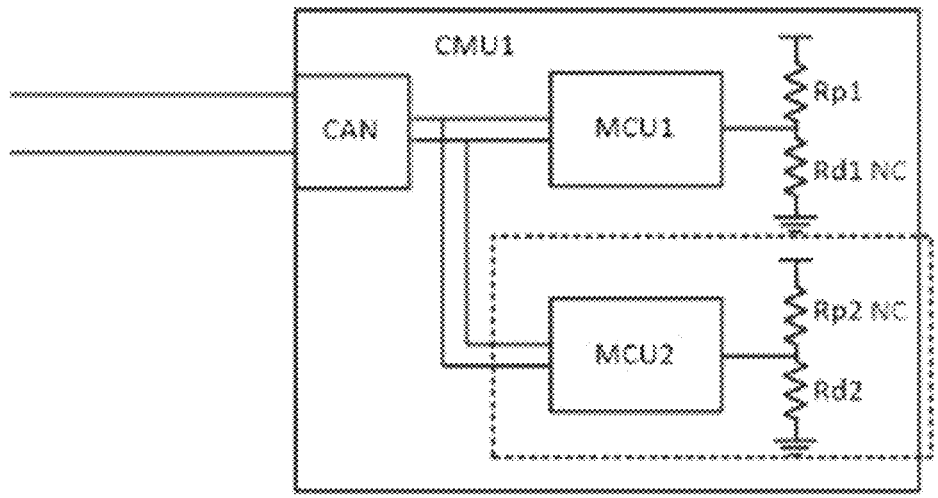
FIG. 1 is a schematic diagram of a connection structure of a fuse adapter board and a CMU in a 0.25C project according to a conventional technology.
Figure 2:
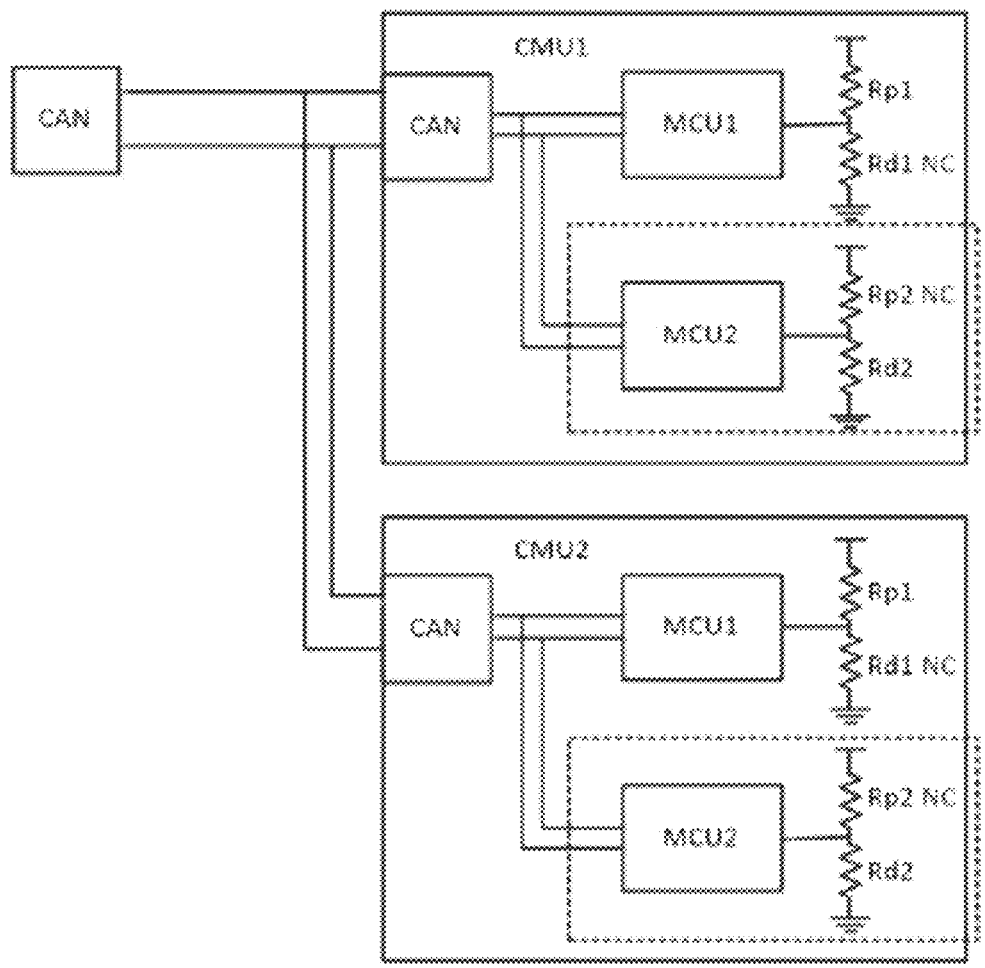
FIG. 2 is a schematic diagram of a connection structure of a fuse adapter board and two CMUs in a 0.5C project according to a conventional technology.

As can be seen from the background as shown in FIG. 1, a resistor Rd1 in resistors connected to MCU1 in CMU is NC (not connected), that is, Rd1 is not soldered to a CAN identification circuit, and MCU1 is connected to a power supply through a pull-up resistor (resistor Rp1). In this case, when MCU1 is powered on, a GPIO pin of MCU1 has a high level. A resistor Rp2 in the resistors connected to MCU2 in the CMU is NC (not connect), that is, Rp2 is not soldered to the CAN identification circuit, and MCU2 is directly grounded through a pull-down resistor (resistor Rd2). In this case, when MCU2 is powered on, a GPIO pin of MCU2 has a low level. As can be seen, in a 0.25C project, the MCU1 and MCU2 can be independently addressed by identifying levels of corresponding GPIO pins. A terminal of the MCU connected to the pull-up resistor or pull-down resistor is a GPIO pin of the MCU.

From the above background, in a 0.5C project, it requires two CMUs. In order to maintain consistency of BOM of the two CMUs, only the MCU1 parts are connected. In other words, only the MCU1 and corresponding pull-up/down resistors are soldered on each CMU. The MCU2 and corresponding pull-up/down resistors are not soldered. Since MCU1 and corresponding pull-up/down resistors in the two CMUs are the same, GPIO pins of the two MCU1s have a same level when the two MCU1s are powered on. As a result, the two MCU1s in the 0.5C project cannot be independently addressed through an external CAN bus, that is, cannot be independently addressed by identifying levels of corresponding GPIO pins.

The present disclosure provides a circuit, method and device for addressing CAN nodes. The fuse adapter board is connected to the first MCU or the second MCU through a short-circuited circuit, to control the short-circuited circuit to be shorted after the first MCU and the second MCU are powered on to realize a low level on the GPIO pin of the first MCU or the second MCU connected to the short-circuited circuit. The GPIO pin of the first MCU or the second MCU which is not connected to the short-circuited circuit still has a high level. On reception of the command for CAN peripheral addressing n, the first MCU and the second MCU set a corresponding CAN addressing based on the respective levels of their GPIO pins. In this way, the two MCUs can address independently in the 0.5C project.

A circuit for addressing CAN nodes is provided according to the present disclosure, which can independently address a first MCU and a second MCU in a 0.5C project compatible with an energy storage system.

According to an embodiment, in the 0.5C project, each CMU has only one MCU works, that is, one MCU controls one 0.5C battery cluster.

Figure 3:
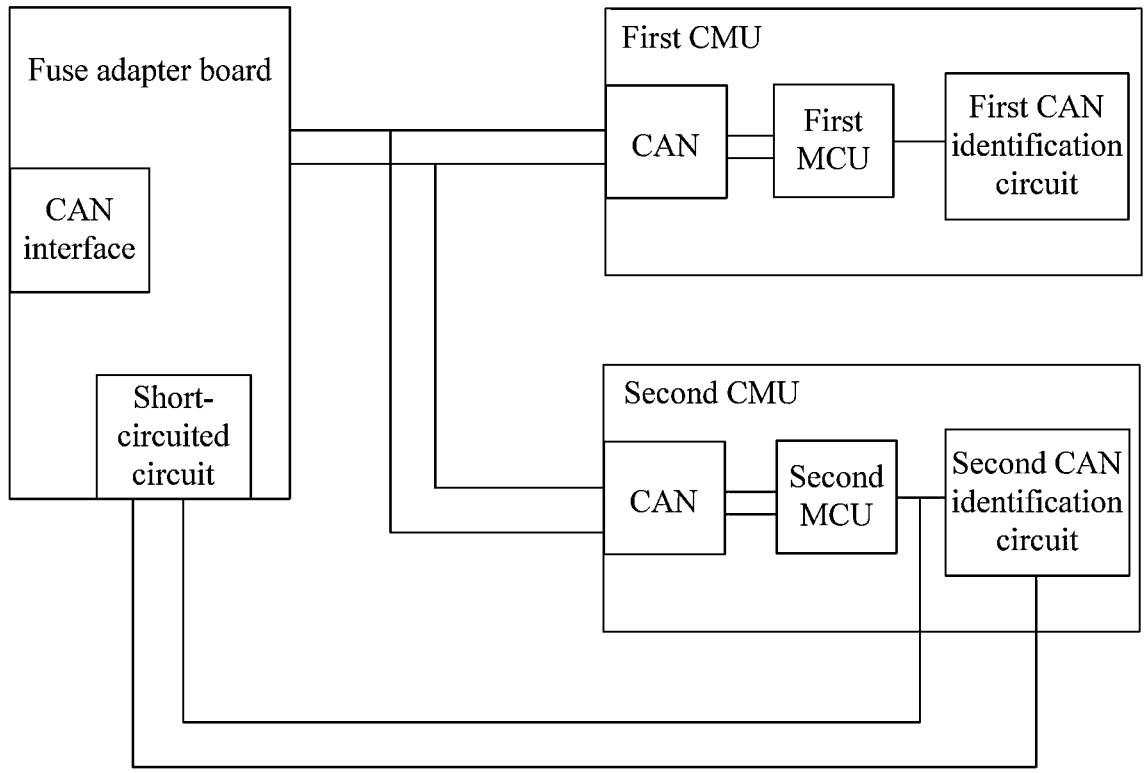
FIG. 3 is a schematic structural diagram of a circuit for addressing CAN nodes according to an embodiment of the present disclosure.

Reference is made to FIG. 3. The circuit for addressing CAN nodes includes a fuse adapter board, a first CMU and a second CMU. The fuse adapter board includes a CAN interface and a short-circuited circuit. The first CMU includes a first MCU and a first CAN identification circuit. The second CMU includes a second MCU and a second CAN identification circuit.

A first terminal of the first MCU is connected to a CAN interface in the fuse adapter board through a CAN interface. A second terminal of the first MCU is connected to the first CAN identification circuit. Where, the second terminal of the first MCU is a GPIO pin of the first MCU.

A first terminal of the second MCU is connected to the CAN interface in the fuse adapter board through a CAN interface. A second terminal of the second MCU is connected to the second CAN identification circuit. Where, the second terminal of the second MCU is a GPIO pin of the second MCU.

In an embodiment, the fuse adapter board is connected to the second MCU through the short-circuited circuit.

In an implementation, a first terminal of the short-circuited circuit is connected to the second terminal of the second MCU, and a second terminal of the short-circuited circuit is connected to the second CAN identification circuit.

In an embodiment, after the first MCU and the second MCU are powered on, the short-circuited circuit is controlled to be shorted to enable the level on the GPIO pin of the second MCU connected to the short-circuited circuit to be a low level and remain the high level on the GPIO pin of the first MCU not connected to the short-circuited circuit. On reception of a command for CAN peripheral addressing n sent by a device for addressing CAN nodes, the first MCU identifies that the level on the GPIO pin of the first MCU is a high level and thereby sets a corresponding CAN addressing to the CAN peripheral addressing n. On reception of the command for CAN peripheral addressing n sent by the device for addressing CAN nodes, the second MCU identifies that the level on the GPIO pin of the second MCU is a low level and thereby sets a corresponding CAN addressing to CAN peripheral addressing n+1. In this way, the first MCU and the second MCU can address independently in the 0.5C project. The device for addressing CAN nodes is a host computer.

It should be noted that the command for CAN peripheral addressing n indicates that the CAN addressing is set to the CAN peripheral addressing n in a case that the GPIO pin has a high level, while the CAN addressing is set to the CAN peripheral addressing n+1 in a case that the GPIO pin has a low level.

Figure 4:
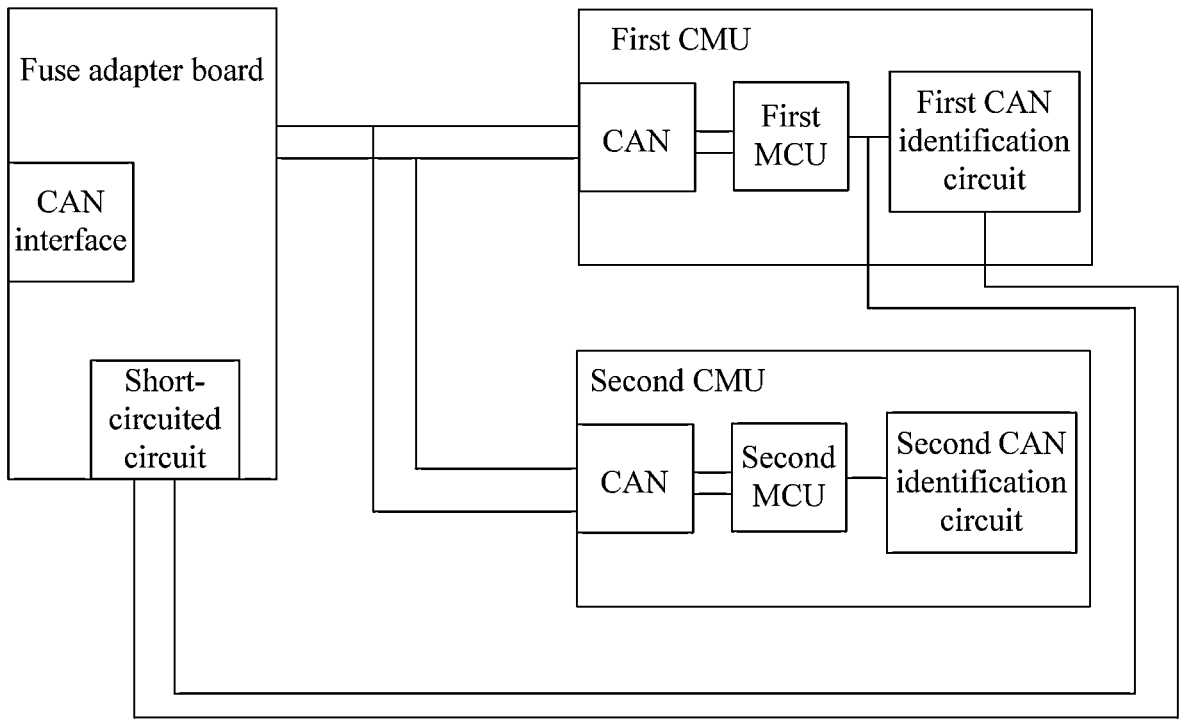
FIG. 4 is a schematic structural diagram of a circuit for addressing CAN nodes according to another embodiment of the present disclosure.

In an embodiment of the present disclosure, the fuse adapter board may be connected to the first MCU through the short-circuited circuit. As shown in FIG. 4, in an example, a first terminal of the short-circuited circuit is connected to the second terminal of the first MCU, and a second terminal of the short-circuited circuit is connected to the first CAN identification circuit.

After the first MCU and the second MCU are powered on, the short-circuited circuit is controlled to be shorted to enable the level on the GPIO pin of the first MCU connected to the short-circuited circuit to be a low level and remain the high level on the GPIO pin of the second MCU not connected to the short-circuited circuit. On reception of a command for CAN peripheral addressing n sent by a host computer, the first MCU identifies that the level on the GPIO pin of the first MCU is a low level and thereby sets a corresponding CAN addressing to the CAN peripheral addressing n+1. On reception of the command for CAN peripheral addressing n sent by the host computer, the second MCU identifies that the level on the GPIO pin of the second MCU is a high level and thereby sets a corresponding CAN addressing to CAN peripheral addressing n. In this way, the first MCU and the second MCU can address independently in the 0.5° C. project.

In a preferred implementation of the present disclosure, the fuse adapter board is connected to the first MCU through the short-circuited circuit, the first CAN identification circuit includes a first resistor, and the second CAN identification circuit includes a second resistor.

The second terminal of the first MCU is connected to a first terminal of the first resistor, the first terminal of the first resistor is grounded through the short-circuited circuit, and a second terminal of the first resistor is connected to a power supply.

The second terminal of the second MCU is connected to a first terminal of the second resistor, and a second terminal of the second resistor is connected to the power supply.

In practical application, the first CAN identification circuit further includes a resistor Rd1 in addition to a first resistor Rp1. In order to ensure a high level on the GPIO pin of the first MCU after the first MCU is powered on, only the first resistor Rp1 is soldered in the first CAN identification circuit without soldering the resistor Rd1. Based on this, in a case that the fuse adapter board is connected to the first MCU through a short-circuited circuit, the short-circuited circuit is controlled to be shorted after the first MCU is powered on, so that the level on the GPIO pin of the first MCU is changed to a low level.

In another preferred implementation of the present disclosure, the fuse adapter board is connected to the second MCU through the short-circuited circuit, the first CAN identification circuit includes a first resistor, and the second CAN identification circuit includes a second resistor.

The second terminal of the first MCU is connected to a first terminal of the first resistor, and a second terminal of the first resistor is connected to a power supply.

The second terminal of the second MCU is connected to a first terminal of the second resistor, the first terminal of the second resistor is grounded through the short-circuited circuit, and a second terminal of the second resistor is connected to the power supply.

In practical application, the second CAN identification circuit further includes a resistor Rd2 in addition to a second resistor Rp2. In order to ensure a high level on the GPIO pin of the second MCU after the second MCU is powered on, only the second resistor Rp2 is soldered in the second CAN identification circuit without soldering the resistor Rd2.

Based on this, in a case that the fuse adapter board is connected to the second MCU through a short-circuited circuit, the short-circuited circuit is controlled to be shorted after the second MCU is powered on, so that the level on the GPIO pin of the second MCU is changed to a low level.

In a preferred implementation of the present disclosure, the short-circuited circuit includes a switch. A first terminal of the fuse adapter board is connected to a first terminal of the switch, and a second terminal of the fuse adapter board is connected to a second terminal of the switch. The first terminal of the switch is connected to the second terminal of the first MCU or the second terminal of the second MCU, and the second terminal of the switch is grounded. The switch is switched on after the first MCU and the second MCU are powered on.

After the first MCU and the second MCU are powered on, the switch is switched on to shorted the short-circuited circuit, causing the level on the GPIO pin of the first MCU or the second MCU connected to the short-circuited circuit to be a low level.

Figure 5:
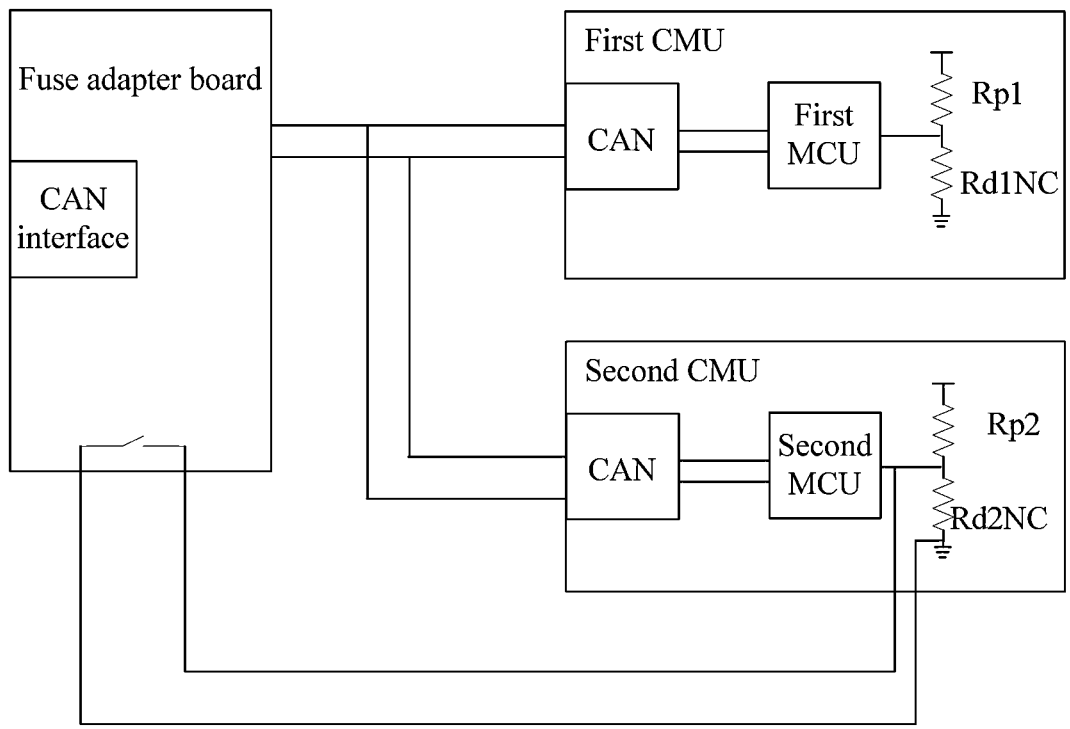
FIG. 5 is a schematic structural diagram of a circuit for addressing CAN nodes according to another embodiment of the present disclosure.

Reference is made to FIG. 5. For example, the circuit includes a fuse adapter board, a first CMU and a second CMU. The fuse adapter board includes a short-circuited circuit. The first CMU includes a first MCU and a first CAN identification circuit. The second CMU includes a second MCU and a second CAN identification circuit. The first CAN identification circuit includes a first resistor Rp1 and a resistor Rd1. The second CAN identification circuit includes a second resistor Rd2 and a resistor Rp2. The short-circuited circuit includes a switch K1.

A first terminal of the first MCU is connected to a CAN interface in the fuse adapter board through the CAN interface. A first terminal of the second MCU is connected to the CAN interface in the fuse adapter board through the CAN interface. A second terminal of the first MCU is connected to a first terminal of the first resistor Rp1. A second terminal of the first resistor Rp1 is connected to a power supply. Where, the resistor Rd1 is not soldered on the first CAN identification circuit.

A second terminal of the second MCU is connected to a first terminal of the second resistor Rp2. A second terminal of the second resistor Rp2 is connected to the power supply. A first terminal of the fuse adapter board is connected to a first terminal of the switch. A second terminal of the fuse adapter board is connected to a second terminal of the switch. The first terminal of the switch is connected to the second terminal of the second MCU, and the second terminal of the switch is grounded. Where, the resistor Rd2 is not soldered on the second CAN identification circuit.

After the first MCU and the second MCU are powered on, the short-circuited circuit is shorted by controlling the switch to be closed, so that the level on the GPIO pin of the second MCU connected to the short-circuited circuit is a low level. The GPIO pin of the first MCU is directly connected to the power supply through a pull-up resistor (i.e., the first resistor Rp1), causing the level on the GPIO pin of the first MCU to be a high level. On reception of a command for CAN peripheral addressing n sent by a host computer, the first MCU identifies that the level on the GPIO pin of the first MCU is a high level and thereby sets a corresponding CAN addressing to the CAN peripheral addressing n. On reception of the command for CAN peripheral addressing n sent by the host computer, the second MCU identifies that level on the GPIO pin of the second MCU is a low level and thereby sets a corresponding CAN addressing to CAN peripheral addressing n+1. In this way, the first MCU and the second MCU can address independently in the 0.5° C. project.

It should be noted that NC shown in FIG. 5 indicates that the resistor Rd1 is not soldered on the first CAN identification circuit, and the resistor Rd2 is not soldered on the second CAN identification circuit.

In another preferred implementation of the present disclosure, the first terminal of the fuse adapter board directly serves as a first terminal of the short-circuited circuit, and the second terminal of the fuse adapter board directly serves as a second terminal of the short-circuited circuit. In this way, the first terminal of the fuse adapter board is connected to the second terminal of the fuse adapter board. The first terminal of the fuse adapter board is connected to the second terminal of the first MCU or the second terminal of the second MCU. The second terminal of the fuse adapter board is grounded.

After the first MCU and the second MCU are powered on, since the first terminal of the fuse adapter board is connected to the second terminal of the fuse adapter board, the short-circuited circuit is shorted. As a result, the level on the GPIO pin of the first MCU or the second MCU connected to the first terminal of the fuse adapter board is a low level.

Figure 6:
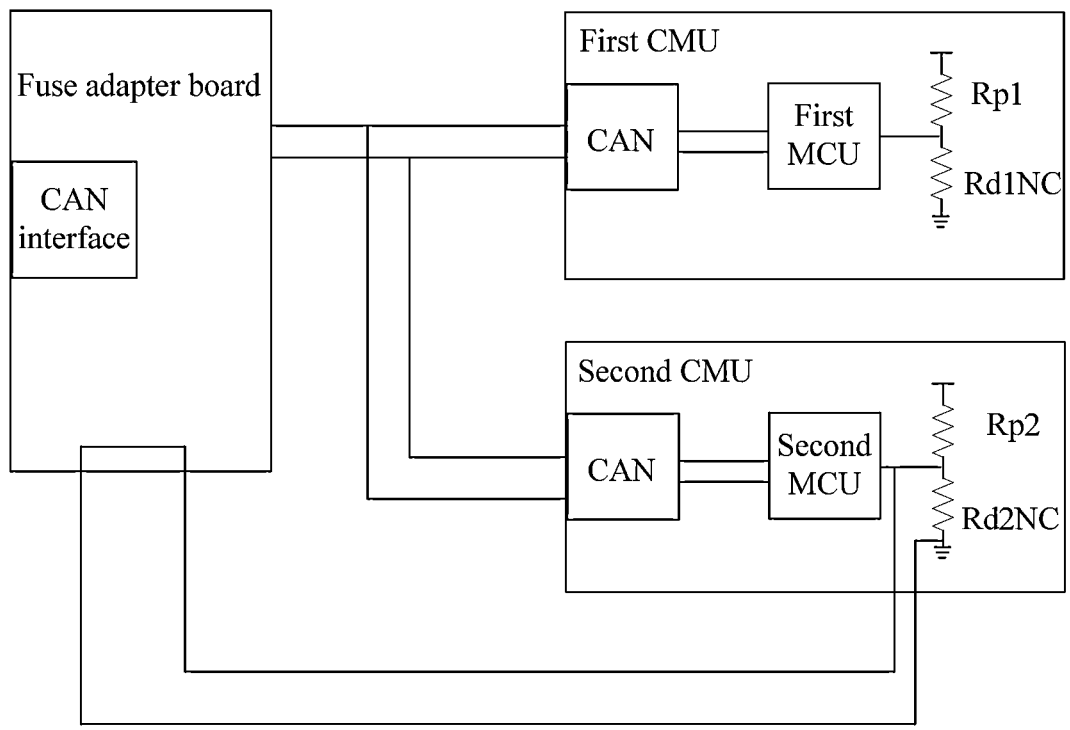
FIG. 6 is a schematic structural diagram of a circuit for addressing CAN nodes according to another embodiment of the present disclosure.

Reference is made to FIG. 6. The circuit for addressing CAN nodes includes a fuse adapter board, a first CMU and a second CMU. The fuse adapter board includes a short-circuited circuit. The first CMU includes a first MCU and a first CAN identification circuit. The second CMU includes a second MCU and a second CAN identification circuit. The first CAN identification circuit includes a first resistor Rp1 and a resistor Rd1. The second CAN identification circuit includes a second resistor Rd2 and a resistor Rp2. A first terminal of the fuse adapter board serves as a first terminal of the short-circuited circuit, and a second terminal of the fuse adapter board serves as a second terminal of the short-circuited circuit.

A first terminal of the first MCU is connected to a CAN interface in the fuse adapter board through a CAN interface. A first terminal of the second MCU is connected to the CAN interface in the fuse adapter board through a CAN interface. A second terminal of the first MCU is connected to a first terminal of the first resistor Rp1. A second terminal of the first resistor Rp1 is connected to a power supply. Where, the resistor Rd1 is not soldered on the first CAN identification circuit.

A second terminal of the second MCU is connected to a first terminal of the second resistor Rp2. A second terminal of the second resistor Rp2 is connected to the power supply. The first terminal of the fuse adapter board is connected to the second terminal of the fuse adapter board. The first terminal of the fuse adapter board is connected to the second terminal of the second MCU, and the second terminal of the fuse adapter board is grounded. Where, the resistor Rd2 is not soldered on the second CAN identification circuit.

After the first MCU and the second MCU are powered on, since the first terminal of the fuse adapter board is connected to the second terminal of the fuse adapter board, the short-circuited circuit is shorted, so that the level on the GPIO pin of the second MCU connected to the fuse adapter board is a low level. The GPIO pin of the first MCU is directly connected to the power supply through a pull-up resistor (i.e., first resistor Rp1), causing the level on the GPIO pin of the first MCU to be a high level. On reception of a command for CAN peripheral addressing n sent by a host computer, the first MCU identifies that the level on the GPIO pin of the first MCU is a high level and thereby sets a corresponding CAN addressing to the CAN peripheral addressing n. On reception of the command for CAN peripheral addressing n sent by the host computer, the second MCU identifies that level on the GPIO pin of the second MCU is a low level and thereby sets a corresponding CAN addressing to CAN peripheral addressing n+1. In this way, the first MCU and the second MCU can address independently in the 0.5C project.

With the circuit for addressing CAN nodes according to the present disclosure, the fuse adapter board is connected to the first MCU or the second MCU through a short-circuited circuit, the short-circuited circuit is controlled to be shorted after the first MCU and the second MCU are powered on to realize a low level on the GPIO pin of the first MCU or the second MCU connected to the short-circuited circuit. Where, the GPIO pin of the first MCU or the second MCU which is not connected to the short-circuited circuit still has a high level. On reception of the command for CAN peripheral addressing n, the first MCU sets a CAN addressing based on the level on the GPIO pin of the first MCU, and the second MCU sets a CAN addressing based on the level on the GPIO pin of the second MCU. In this way, the first MCU and the second MCU can address independently in the 0.5C project. In addition, in the technical solution provided in the present disclosure, it can enable the two MCUs to address independently in the 0.5C project by only adding one short-circuited circuit on the basis of the conventional circuit for the 0.5C project. As a result, the consistency of processing logics of the 0.5C project and the 0.25 project is ensured, and the consistency of CMU and BOM is ensured. Further, the manufacture and testing process are significantly simplified, which improves the manufacture efficiency and saves the costs.

Figure 7:
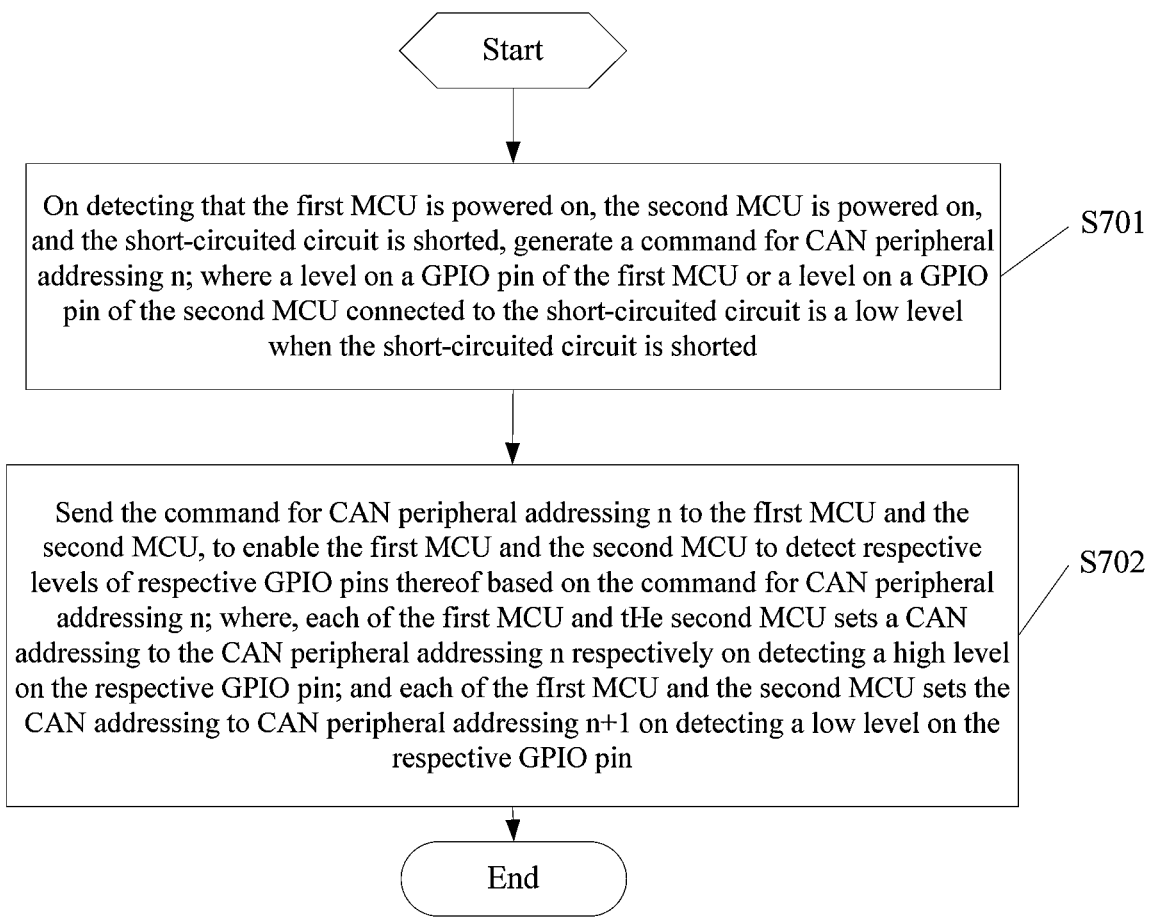
FIG. 7 is a flow chart of a method for addressing CAN nodes according to an embodiment of the present disclosure.

A method for addressing CAN nodes is further provided according to an embodiment of the present disclosure. The method is applicable to the circuit for addressing CAN nodes described in the above embodiments of the present disclosure, and is applied to a device for addressing CAN nodes. Reference is made to FIG. 7. The method for addressing CAN nodes includes steps S701 to S702 as follows.

In S701, on detecting that the first MCU is powered on, the second MCU is powered on, and the short-circuited circuit is shorted, a command for CAN peripheral addressing n is generated. In a case that the short-circuited circuit is shorted, the level on the GPIO pin of the first MCU or the second MCU connected to the short-circuited circuit is a low level.

In an embodiment of the present disclosure, on detecting that that the first MCU, the second MCU are powered on as well as the short-circuited circuit is shorted in the circuit for addressing CAN nodes as described in any of the above embodiments, the command for CAN peripheral addressing n is generated by the device for addressing CAN nodes. The device for addressing CAN nodes may be a host computer, which is not limited in the embodiments of the present disclosure.

It should be noted that the command for CAN peripheral addressing n indicates that the CAN addressing is set to the CAN peripheral addressing n in a case that the GPIO pin has a high level, while the CAN addressing is set to the CAN peripheral addressing n+1 in a case that the GPIO pin has a low level.

In an embodiment of the present disclosure, after the short-circuited circuit in the circuit for addressing CAN nodes is shorted, it may enable the level on the GPIO pin of the first MCU or the second MCU connected to the short-circuited circuit to be a low level, and the level on the GPIO pin of the first MCU or the second MCU not connected to the short-circuited circuit to be a high level.

In S702, the command for CAN peripheral addressing n is sent to the first MCU and the second MCU, to enable the first MCU and the second MCU to detect their own levels of GPIO pins, respectively, based on the command for CAN peripheral addressing n. Where, for each of the first MCU and the second MCU, it sets the CAN addressing to the CAN peripheral addressing n+1, on detecting a low level on their respective GPIO pin; and it set the CAN addressing to CAN peripheral addressing n on detecting a high level on their respective GPIO pin.

In an embodiment, after generating the command for CAN peripheral addressing n, the device for addressing CAN node may send the command for CAN peripheral addressing n to the first MCU and the second MCU, so that the first MCU and the second MCU detect their levels of their respective GPIO pins, based on the command for CAN peripheral addressing n. Where, for each of the first MCU and the second MCU, it sets the CAN addressing to the CAN peripheral addressing n, on detecting a high level on their respective GPIO pin; and it set the CAN addressing to CAN peripheral addressing n+1 on detecting a low level on their respective GPIO pin. In this way, the first MCU and the second MCU can independently address in the 0.5C project.

In the method for addressing CAN nodes provided by the embodiments of the present disclosure, the generated command for CAN peripheral addressing n may be sent to the first MCU and the second MCU after detecting that the first MCU is powered on, the second MCU is powered on, and the short-circuited circuit is shorted, so that the first MCU and the second MCU detect their levels of their respective GPIO pins, based on the command for CAN peripheral addressing n. Where, for each of the first MCU and the second MCU, it sets the CAN addressing to the CAN peripheral addressing n, on detecting a high level on their respective GPIO pin; and it set the CAN addressing to CAN peripheral addressing n+1 on detecting a low level on their respective GPIO pin. In this way, the first MCU and the second MCU can independently address in the 0.5C project.

Based on the method described above, a device for addressing CAN nodes is further provided in the present disclosure. The device may be a host computer, which is applicable to the circuit for addressing CAN nodes. The circuit for addressing CAN nodes includes a fuse adapter board, a first CMU and a second CMU. The fuse adapter board includes a short-circuited circuit. The first CMU includes a first MCU. The second CMU includes a second MCU. The device includes a CAN peripheral addressing n command generating unit and a CAN peripheral addressing n command sending unit. In an embodiment, the CAN peripheral addressing n command generating unit and the CAN peripheral addressing n command sending unit may be a CAN peripheral addressing n command generating circuit and a CAN peripheral addressing n command sending circuit respectively.

Where, the CAN peripheral addressing n command generating circuit is configured to generate a command for CAN peripheral addressing n, on detecting that the first MCU is powered on, the second MCU is powered on, and the short-circuited circuit is shorted; where, a level on a GPIO pin of the first MCU or the second MCU connected to the short-circuited circuit is a low level when the short-circuited circuit is shorted.

The CAN peripheral addressing n command sending circuit is configured to send the command for CAN peripheral addressing n to the first MCU and the second MCU, to enable the first MCU and the second MCU to detect respective levels on their respective GPIO pins based on the command for CAN peripheral addressing n; where each of the first MCU and the second MCU respectively sets a respective CAN addressing to the CAN peripheral addressing n on detecting a high level on the respective GPIO pin; and each of the first MCU and the second MCU sets the respective CAN addressing to CAN peripheral addressing n+1 on detecting a low level on their respective GPIO pin.

It should be noticed that the CAN peripheral addressing n command generating circuit and the CAN peripheral addressing n command sending circuit above are only one example of the CAN peripheral addressing n command generating unit and the CAN peripheral addressing n command sending unit, which should not be construed as an limitation on the implementation of CAN peripheral addressing n command generating unit and the CAN peripheral addressing n command sending unit in the present disclosure.

With the device for addressing CAN nodes provided in the present disclosure, the generated command for CAN peripheral addressing n may be sent to the first MCU and the second MCU after detecting that the first MCU is powered on, the second MCU is powered on, and the short-circuited circuit is shorted, so that the first MCU and the second MCU detect their levels on their respective GPIO pins, based on the command for CAN peripheral addressing n. Where, for each of the first MCU and the second MCU, it sets the CAN addressing to the CAN peripheral addressing n, on detecting a high level on their respective GPIO pin; and it set the CAN addressing to CAN peripheral addressing n+1 on detecting a low level on their respective GPIO pin. In this way, the first MCU and the second MCU can independently address in the 0.5C project.

With the circuit, method and device for addressing CAN nodes according to the present disclosure, the fuse adapter board is connected to the first MCU or the second MCU through a short-circuited circuit. After the first MCU and the second MCU are powered on, the short-circuited circuit is controlled to be shorted to enable a low level on the GPIO pin of the first MCU or the second MCU connected to the short-circuited circuit, while remaining a high level on the GPIO pin of the first MCU or the second MCU which is not connected to the short-circuited circuit. On reception of the command for CAN peripheral addressing n, each of the first MCU and the second MCU set the respective CAN addressing based on the respective level on the respective GPIO pin. In this way, the first MCU and the second MCU can independently address in the 0.5C project.

The same and similar parts among the embodiments may be referred to each other. Each of the embodiments focuses on its differences from the other embodiments. The system or system embodiments are essentially similar to the method embodiments, and therefore are described in brief. Reference may be made to the description of the method embodiments for relevant details of the system or system embodiments. The systems and system embodiments described above are only illustrative. The units described as separate components may or may not be physically separated. Components shown as units may or may not be a physical unit, that is, the components may be located at a same position or distributed over multiple network units. Some or all of the modules may be selected based on an actual need to achieve the objective of the solutions in the embodiments of the present disclosure. Those of ordinary skills in the art can understand and implement the solutions without any creative effort.

Those skilled in the art may further understand that, units and algorithm steps described in conjunction with the embodiments disclosed herein may be realized by electronic hardware, computer software or a combination thereof. In order to clearly describe interchangeability of the hardware and the software, the composition and steps of each embodiment are generally described above based on functions. Whether a function is to be implemented by hardware or software depends on a particular application of the technical solutions and a design constraint. Those skilled in the art may implement the described functions through different methods for each specific application. Such implementation should not be considered going beyond the scope of the present disclosure.

For the above description of the disclosed embodiments, the features recorded in the embodiments in this specification may be replaced or combined with each other so as to enable those skilled in the art to implement or use the present disclosure. Various modifications to the embodiments are apparent to those skilled in the art, and the generic principles defined herein may be practiced in other embodiments without departing from the spirit or scope of the present disclosure. Therefore, the present disclosure is not to be limited to the embodiments shown herein but is to be conformed with the widest scope consistent with the principles and novel features disclosed herein.

The invention claimed is:

1. A circuit for addressing CAN nodes, comprising a fuse adapter board, a first CMU and a second CMU; wherein
the fuse adapter board comprises a short-circuited circuit;
the first CMU comprises a first MCU and a first CAN identification circuit, wherein a first terminal of the first MCU is connected to a CAN interface in the fuse adapter board through a CAN interface, and a second terminal of the first MCU is connected to the first CAN identification circuit;
the second CMU comprises a second MCU and a second CAN identification circuit, wherein a first terminal of the second MCU is connected to a CAN interface in the fuse adapter board through the CAN interface, and a second terminal of the second MCU is connected to the second CAN identification circuit;
the fuse adapter board is connected to the first MCU or the second MCU through the short-circuited circuit, and is configured to control the short-circuited circuit to be shorted to enable a level on a GPIO pin of the first MCU or a GPIO pin of the second MCU connected to the short-circuited circuit to be a low level;
the first MCU is configured to set a CAN addressing based on a level on the GPIO pin of the first MCU; and
the second MCU is configured to set a CAN addressing based on a level on the GPIO pin of the second MCU.

2. The circuit according to claim 1, wherein in a case that the fuse adapter board is connected to the first MCU through the short-circuited circuit, and the first CAN identification circuit comprises a first resistor; wherein
the second terminal of the first MCU is connected to a first terminal of the first resistor, the first terminal of the first resistor is grounded through the short-circuited circuit, and a second terminal of the first resistor is connected to a power supply.

3. The circuit according to claim 2, wherein the second CAN identification circuit comprises a second resistor; and the second terminal of the second MCU is connected to a first terminal of the second resistor, and a second terminal of the second resistor is connected to the power supply.

4. The circuit according to claim 1, wherein in a case that the fuse adapter board is connected to the second MCU through the short-circuited circuit, and the second CAN identification circuit comprises a second resistor; wherein
- the second terminal of the second MCU is connected to a first terminal of the second resistor, the first terminal of the second resistor is grounded through the short-circuited circuit, and a second terminal of the second resistor is connected to a power supply.

5. The circuit according to claim 4, wherein the first CAN identification circuit comprises a first resistor; and the second terminal of the first MCU is connected to a first terminal of the first resistor, and a second terminal of the first resistor is connected to the power supply.

6. The circuit according to claim 1, wherein the short-circuited circuit comprises a switch;
- a first terminal of the fuse adapter board is connected to a first terminal of the switch, and a second terminal of the fuse adapter board is connected to a second terminal of the switch;
- the first terminal of the switch is connected to the second terminal of the first MCU or the second terminal of the second MCU, and the second terminal of the switch is grounded; and
- the switch is switched on after the first MCU and the second MCU are powered on, to enable the level on the GPIO pin of the first MCU or the GPIO pin of the second MCU connected to the first terminal of the switch to be the low level.

7. The circuit according to claim 1, wherein,
- a first terminal of the fuse adapter board is connected to a second terminal of the fuse adapter board;
- the first terminal of the fuse adapter board is connected to the second terminal of the first MCU or the second terminal of the second MCU, and the second terminal of the fuse adapter board is grounded; wherein the first terminal of the fuse adapter board serves as a first terminal of the short-circuited circuit, and the second terminal of the fuse adapter board serves as a second terminal of the short-circuited circuit; and
- the first terminal of the fuse adapter board and the second terminal of the fuse adapter board are shorted after the first MCU and the second MCU are powered on, to enable the level on the GPIO pin of the first MCU or the GPIO pin of the second MCU connected to the first terminal of the fuse adapter board to be the low level.

8. A method for addressing CAN nodes, applied to a circuit for addressing CAN nodes, wherein the circuit comprises: a fuse adapter board, a first CMU and a second CMU, the fuse adapter board comprises a short-circuited circuit, the first CMU comprises a first MCU and a first CAN identification circuit, and the second CMU comprises a second MCU and a second CAN identification circuit; wherein
- a first terminal of the first MCU is connected to a CAN interface in the fuse adapter board through a CAN interface, and a second terminal of the first MCU is connected to the first CAN identification circuit;
- a first terminal of the second MCU is connected to a CAN interface in the fuse adapter board through the CAN interface, and a second terminal of the second MCU is connected to the second CAN identification circuit;
- the fuse adapter board is connected to the first MCU or the second MCU through the short-circuited circuit, and is configured to control the short-circuited circuit to be shorted to enable a level on a GPIO pin of the first MCU or a GPIO pin of the second MCU connected to the short-circuited circuit to be a low level;
- the first MCU is configured to set a CAN addressing based on a level on the GPIO pin of the first MCU; and
- the second MCU is configured to set a CAN addressing based on a level on the GPIO pin of the second MCU;
the method comprises:
- generating a command for CAN peripheral addressing n, on detecting that the first MCU is powered on, the second MCU is powered on, and the short-circuited circuit is shorted; wherein a level on a GPIO pin of the first MCU or a level on a GPIO pin of the second MCU connected to the short-circuited circuit is a low level when the short-circuited circuit is shorted; and
- sending the command for CAN peripheral addressing n to the first MCU and the second MCU, to enable the first MCU and the second MCU to detect respective levels on respective GPIO pins thereof based on the command for CAN peripheral addressing n;
- wherein, each of the first MCU and the second MCU sets a respective CAN addressing to the CAN peripheral addressing n on detecting a high level on the respective GPIO pin; and each of the first MCU and the second MCU sets the respective CAN addressing to CAN peripheral addressing n+1 on detecting a low level on the respective GPIO pin.

9. A device for addressing CAN nodes, applied to a circuit for addressing CAN nodes, wherein the circuit comprises: a fuse adapter board, a first CMU and a second CMU, the fuse adapter board comprises a short-circuited circuit, the first CMU comprises a first MCU and a first CAN identification circuit, and the second CMU comprises a second MCU and a second CAN identification circuit; wherein
- a first terminal of the first MCU is connected to a CAN interface in the fuse adapter board through a CAN interface, and a second terminal of the first MCU is connected to the first CAN identification circuit;
- a first terminal of the second MCU is connected to a CAN interface in the fuse adapter board through the CAN interface, and a second terminal of the second MCU is connected to the second CAN identification circuit;
- the fuse adapter board is connected to the first MCU or the second MCU through the short-circuited circuit, and is configured to control the short-circuited circuit to be shorted to enable a level on a GPIO pin of the first MCU or a GPIO pin of the second MCU connected to the short-circuited circuit to be a low level;
- the first MCU is configured to set a CAN addressing based on a level on the GPIO pin of the first MCU; and
- the second MCU is configured to set a CAN addressing based on a level on the GPIO pin of the second MCU;
the device comprises:
- a CAN peripheral addressing n command generating circuit, configured to generate a command for CAN peripheral addressing n, on detecting that the first MCU is powered on, the second MCU is powered on, and the short-circuited circuit is shorted, wherein a level on a GPIO pin of the first MCU or the second MCU connected to the short-circuited circuit is a low level when the short-circuited circuit is shorted; and
- a CAN peripheral addressing n command sending circuit, configured to send the command for CAN peripheral addressing n to the first MCU and the second MCU, to enable the first MCU and the second MCU to detect respective levels of respective GPIO pins thereof based on the command for CAN peripheral addressing n; wherein each of the first MCU and the second MCU sets a respective CAN addressing to the CAN peripheral addressing n on detecting a high level on the respective GPIO pin; and each of the first MCU and the second MCU sets the respective CAN addressing to CAN peripheral addressing n+1 on detecting a low level on the respective GPIO pin.

10. The device according to claim 9, wherein in a case that the fuse adapter board is connected to the first MCU through the short-circuited circuit, and the first CAN identification circuit comprises a first resistor; wherein
the second terminal of the first MCU is connected to a first terminal of the first resistor, the first terminal of the first resistor is grounded through the short-circuited circuit, and a second terminal of the first resistor is connected to a power supply.

11. The device according to claim 10, wherein the second CAN identification circuit comprises a second resistor; and the second terminal of the second MCU is connected to a first terminal of the second resistor, and a second terminal of the second resistor is connected to the power supply.

12. The device according to claim 9, wherein in a case that the fuse adapter board is connected to the second MCU through the short-circuited circuit, and the second CAN identification circuit comprises a second resistor; wherein
the second terminal of the second MCU is connected to a first terminal of the second resistor, the first terminal of the second resistor is grounded through the short-circuited circuit, and a second terminal of the second resistor is connected to a power supply.

13. The device according to claim 12, wherein the first CAN identification circuit comprises a first resistor; and the second terminal of the first MCU is connected to a first terminal of the first resistor, and a second terminal of the first resistor is connected to the power supply.

14. The device according to claim 9, wherein the short-circuited circuit comprises a switch;
a first terminal of the fuse adapter board is connected to a first terminal of the switch, and a second terminal of the fuse adapter board is connected to a second terminal of the switch;
the first terminal of the switch is connected to the second terminal of the first MCU or the second terminal of the second MCU, and the second terminal of the switch is grounded; and
the switch is switched on after the first MCU and the second MCU are powered on, to enable the level on the GPIO pin of the first MCU or the GPIO pin of the second MCU connected to the first terminal of the switch to be the low level.

15. The device according to claim 9, wherein
a first terminal of the fuse adapter board is connected to a second terminal of the fuse adapter board;
the first terminal of the fuse adapter board is connected to the second terminal of the first MCU or the second terminal of the second MCU, and the second terminal of the fuse adapter board is grounded; wherein the first terminal of the fuse adapter board serves as a first terminal of the short-circuited circuit, and the second terminal of the fuse adapter board serves as a second terminal of the short-circuited circuit; and
the first terminal of the fuse adapter board and the second terminal of the fuse adapter board are shorted after the first MCU and the second MCU are powered on, to enable the level on the GPIO pin of the first MCU or the GPIO pin of the second MCU connected to the first terminal of the fuse adapter board to be the low level.

* * * * *